(12) United States Patent
Swearingen et al.

(10) Patent No.: US 8,892,265 B2
(45) Date of Patent: Nov. 18, 2014

(54) AUTOMATIC RAM AIR TURBINE DEPLOYMENT

(75) Inventors: Paul Swearingen, Rockford, IL (US); Scott J. Marks, Oregon, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 912 days.

(21) Appl. No.: 13/052,797

(22) Filed: Mar. 21, 2011

(65) Prior Publication Data

US 2012/0245746 A1 Sep. 27, 2012

(51) Int. Cl.
*G06F 1/26* (2006.01)
*B64D 41/00* (2006.01)

(52) U.S. Cl.
CPC ................... *B64D 41/007* (2013.01)
USPC ....................................................... 700/287

(58) Field of Classification Search
CPC .................................................... B64D 41/007
USPC ........................................................ 700/287
See application file for complete search history.

(56) References Cited

U.S. PATENT DOCUMENTS

| | | | | |
|---|---|---|---|---|
| 5,122,036 A * | 6/1992 | Dickes et al. | ............... | 417/222.1 |
| 5,333,198 A * | 7/1994 | Houlberg et al. | ............. | 380/270 |
| 5,623,411 A * | 4/1997 | Morvan | ........................... | 701/14 |
| 6,127,758 A * | 10/2000 | Murry et al. | ................... | 310/168 |
| 6,662,086 B2 * | 12/2003 | Lemelson et al. | ................ | 701/3 |
| 7,364,116 B2 * | 4/2008 | Nguyen et al. | ................... | 244/58 |
| 7,513,119 B2 * | 4/2009 | Zielinski et al. | ................ | 60/778 |
| 7,630,820 B2 * | 12/2009 | Sims et al. | ..................... | 701/100 |
| 7,805,204 B2 * | 9/2010 | Ghanekar et al. | ............... | 700/22 |
| 8,061,650 B2 * | 11/2011 | Nguyen et al. | ................... | 244/58 |
| 2003/0141912 A1* | 7/2003 | Sudjian | ......................... | 327/208 |
| 2007/0267540 A1* | 11/2007 | Atkey et al. | ..................... | 244/58 |
| 2011/0127372 A1* | 6/2011 | Nguyen et al. | ................... | 244/58 |
| 2011/0315815 A1* | 12/2011 | Finney | ............................. | 244/58 |

* cited by examiner

*Primary Examiner* — Thomas Tarcza
*Assistant Examiner* — Alex C Dunn
(74) *Attorney, Agent, or Firm* — Stephen G. Mican

(57) ABSTRACT

A method of deploying a ram air turbine for an aircraft only during flight that deploys the ram air turbine only when a predetermined number of aeronautical power generation contactor signals are in an engaged state, an external power generation contactor is in a disengaged state, wheels for the aircraft are in an airborne state and all of multiple primary electric buses are in a fault state that represents electric potential below a predetermined level.

21 Claims, 2 Drawing Sheets

AUTOMATIC RAM AIR TURBINE DEPLOYMENT

Figure 1:
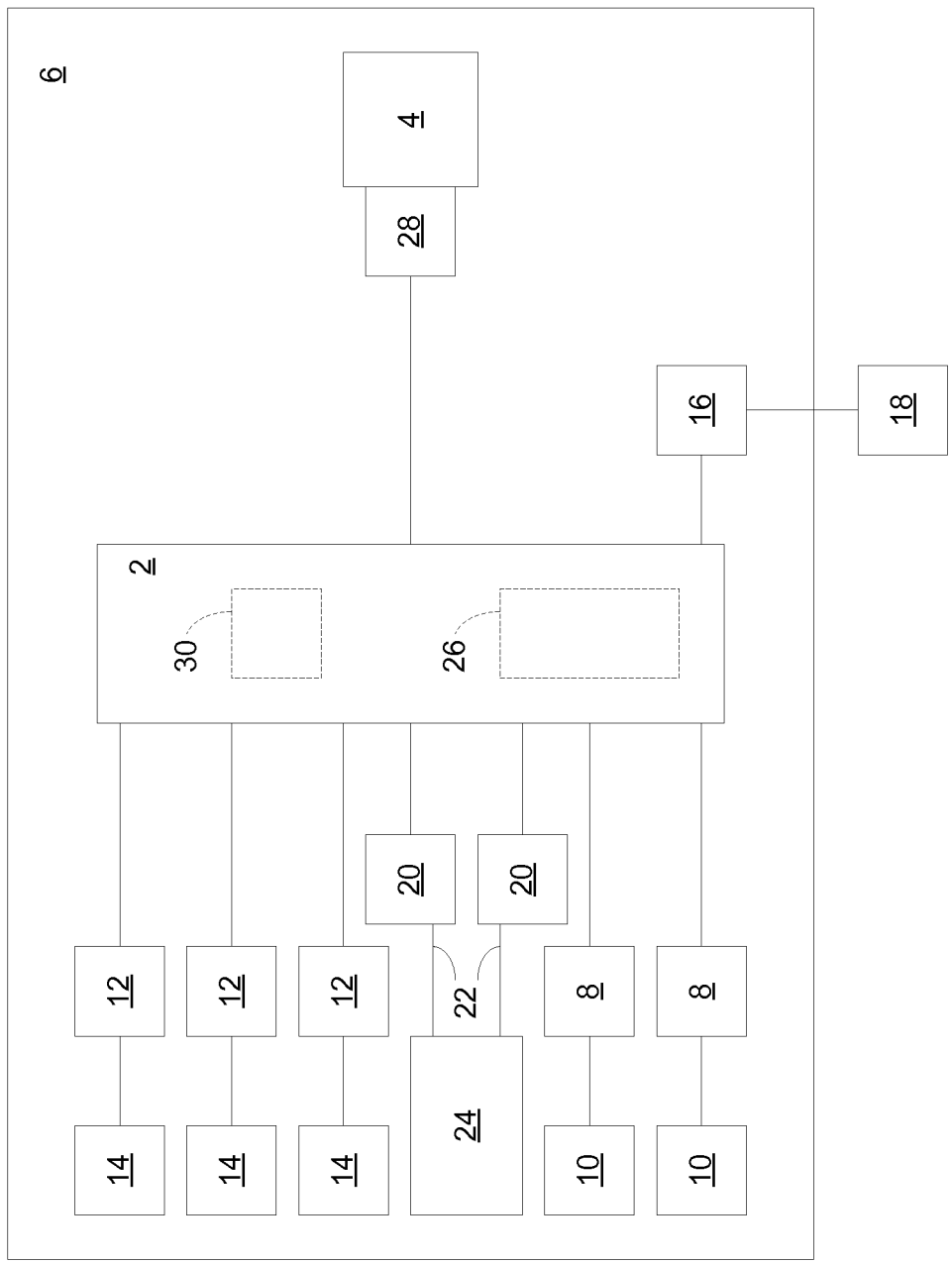
Figure 2:
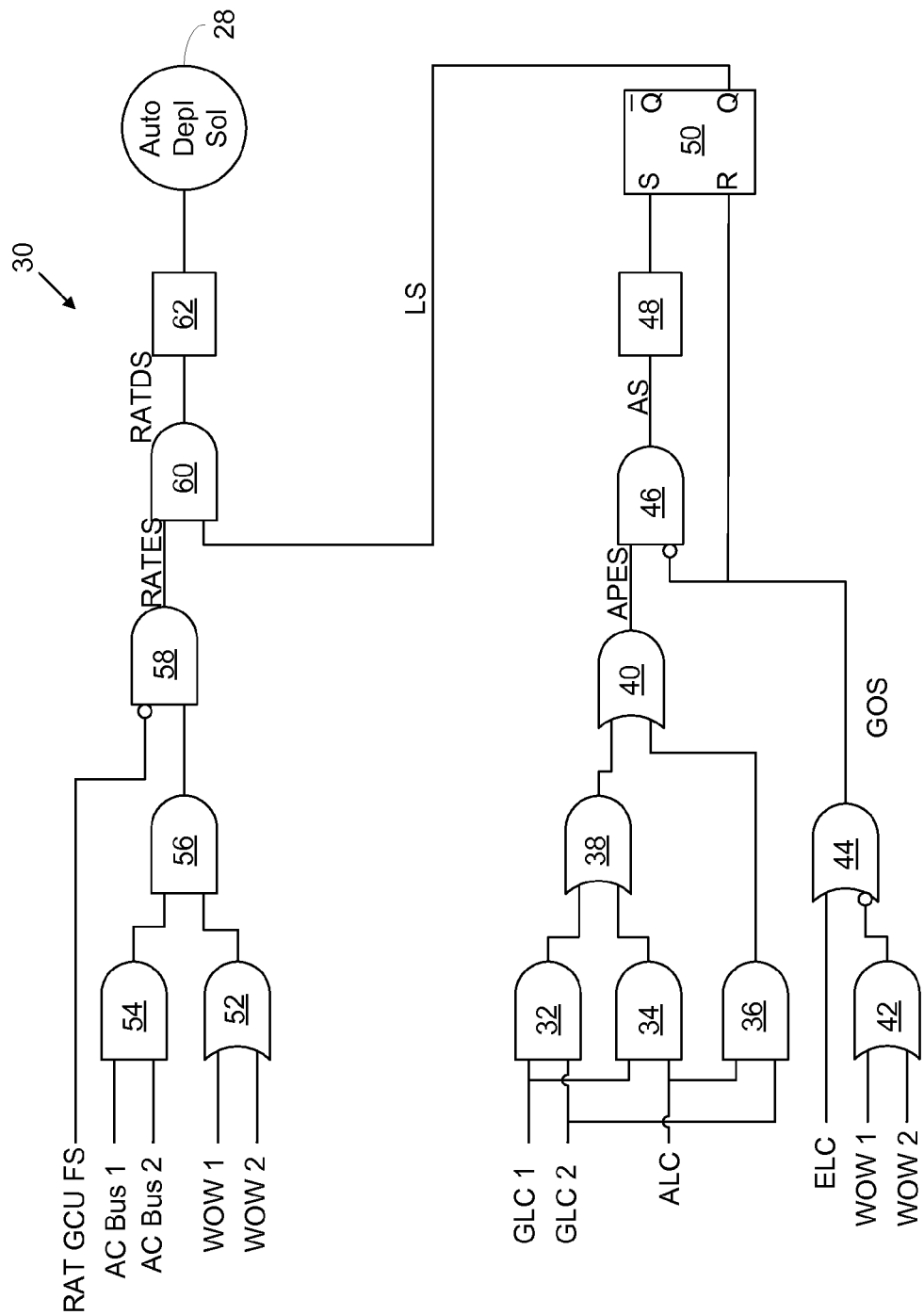

FIG. 1 is a schematic diagram of a controller for a ram air turbine that may incorporate a possible embodiment. FIG. 2 is a schematic diagram of digital logic for the controller that performs a method of automatic ram air turbine deployment according to a possible embodiment.

In order for a ram air turbine for an aircraft to deploy only when emergency power conditions arise in flight and to prevent such deployment whilst the aircraft sits on the ground during ground operations, it is necessary to allow automatic deployment of the ram air turbine only upon the occurrence of a sequence of aircraft system conditions as represented by corresponding digital signals. In particular, automatic deployment of the ram air turbine should only be able to occur when the aircraft is airborne, there is a fault in the aircraft electric power distribution such that there is more than a predetermined loss of electric potential in at least one electric power distribution bus in the aircraft electric power distribution system and the ram air turbine deployment system is fault-free. In order to insure that the aircraft is only airborne when such deployment of the ram air turbine occurs, it is also necessary that prior to deployment only the airborne electric power sources have supplied the aircraft electric power distribution system, no external ground power sources are connected, and the aircraft has sat on the ground.

FIG. 1 is a schematic diagram of a controller 2 for a ram air turbine 4 in an aircraft 6. The automatic deployment system 2 monitors the status of multiple weight on wheels (WOW) sensors 8 for corresponding aircraft wheels 10, multiple aeronautical power generator contactors 12 for corresponding aeronautical power generators 14, an external power generator contactor 16 for a corresponding external power generator 18 located external to the aircraft 6, multiple primary electric bus sensors 20 for corresponding primary electric buses 22 from an aircraft electric power distribution system 24, as well as the state of its own emergency power supply system 26. The automatic deployment system 2 may engage a ram air turbine deployment solenoid 28 that deploys the ram air turbine 4 when the automatic deployment system 2 determines that the aircraft 6 is airborne, the electric power distribution system 24 does not provide sufficient electric potential on the primary electric buses 22 and the emergency power supply system 26 for the is functional.

FIG. 2 is a schematic diagram of digital logic in the form of an automatic deployment circuit 30 according to a possible embodiment for the ram air turbine 4 that implements a method of automatically deploying the ram air turbine 4 only when the aircraft 6 is in flight. To establish whether the aircraft 6 in which the ram air turbine 4 resides has been airborne or on the ground prior to any serious electrical fault, the automatic deployment circuit 30 may receive multiple aeronautical power generation contactor signals from the aeronautical power generator contactors 12. The aeronautical power generation contactor signals represent the engagement of the respective aeronautical power generators 14 when in an engaged state, represented by value 1, or their disengagement when in a disengaged state, represented by value 0. The automatic deployment circuit 30 changes an aeronautical power engagement signal from a negative state, represented by value 0, to a positive state, represented by value 1, when at least a predetermined number of the aeronautical power generation contactor signals are in the engaged state.

For instance, if the aircraft has three aeronautical power generators 14 as shown in FIG. 1, wherein two of the three aeronautical power generators 14 are two main engine generators with respective primary power generation contactor signals represented by GLC 1 and GLC 2 and the remaining aeronautical power generator is an auxiliary power unit generator with a respective aeronautical power generation contactor signal represented by ALC, the engaged state of two of the three aeronautical power generation contactor signals GLC 1, GLC 2 and ALC may change the aeronautical power engagement signal from the negative state to the positive state. FIG. 2 shows an arrangement of the automatic deployment circuit 30 to change the state of the aeronautical power engagement signal under this circumstance. An AND gate 32 receives the aeronautical power generation contactor signals GLC 1 and GLC 2, an AND gate 34 receives the aeronautical power generation contactor signals GLC 1 and ALC and an AND gate 36 receives the aeronautical power generation contactor signals GLC 2 and ALC. An OR gate 38 receives outputs of the AND gate 32 and the AND gate 34, and an OR gate 40 receives outputs of the AND gate 36 and the OR gate 38. The output of the OR gate 40 serves as the aeronautical power engagement signal (APES), and it changes from the negative state to the positive state when any two of the three aeronautical power generation contactor signals GLC 1, GLC 2 and ALC are in the engagement state, as shown in Table 1.

TABLE 1

| GLC 1 | GLC 2 | ALC | APES |
| --- | --- | --- | --- |
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

To further establish whether or not the aircraft 6 in which the ram air turbine 4 resides has been airborne or on the ground prior to any serious electrical fault, the automatic deployment circuit 30 may receive multiple weight-on-wheels (WOW) signals from the WOW sensors 8 and an external power generation contactor signal from the external power generator contactor 16 that represents the engagement of the respective external power generator 18. Each WOW signal represents that its respective aircraft wheel 10 is either on the ground when in a ground state, represented by value 0, or the aircraft wheel 10 is in the air when in an air state, represented by value 1. The external power generation contactor signal represents the engagement of the external power generator 18 when in an engaged state, represented by value 1, or its disengagement when in a disengaged state, represented by value 0. The automatic deployment circuit 30 changes a ground operations signal from a negative value, represented by value 0, to a positive value, represented by value 1, when the external power generation contactor signal is in the engaged state or when multiple ones of the WOW signals are in the ground state.

For instance, if the aircraft 6 receives external or ground power from the external power generator 18 with a respective external power generation contactor signal ELC and two WOW signals WOW 1 and WOW 2 that each represent the state of a respective aircraft wheel 10, the engaged state of the external power generation contactor signal ELC or the ground state of the two WOW signals WOW 1 and WOW 2 may change the ground operations signal from the negative state to the positive state. FIG. 2 shows an arrangement of the automatic deployment circuit 2 to change the ground operations signal from a negative state to a positive state under this circumstance. An OR gate 42 receives the two WOW signals WOW 1 and WOW 2. An OR gate 44 receives the external power generation contactor signal ELC and output of the OR gate 42 by way of an inverted input. The output of the OR gate 44 serves as the ground operations signal (GOS), and it changes from the negative state to the positive state when the external power generation contactor signal ELC is in the engaged state or both the WOW signals WOW 1 and WOW 2 are in the ground state, as shown in Table 2.

TABLE 2

| ELC | WOW 1 | WOW 2 | GOS |
|-----|-------|-------|-----|
| 0 | 0 | 0 | 1 |
| 0 | 0 | 1 | 0 |
| 0 | 1 | 0 | 0 |
| 0 | 1 | 1 | 0 |
| 1 | 0 | 0 | 1 |
| 1 | 0 | 1 | 1 |
| 1 | 1 | 0 | 1 |
| 1 | 1 | 1 | 1 |

FIG. 2 shows an arrangement of the automatic deployment circuit 30 to change an airborne signal from a negative state, represented by value 0, to a positive state, represented by value 1, when the aeronautical power engagement signal is in the positive state and the ground operations signal remains in the negative state. An AND gate 46 receives the aeronautical power engagement signal from the output of the OR gate 40 and receives the ground operations signal from the output of the OR gate 44 by way of an inverted input. The output of the AND gate 46 serves as the airborne signal (AS), and it changes from the negative state, represented by value 0, to the positive state, represented by value 1, when the aeronautical power engagement signal is in the positive state and the ground operations signal remains in the negative state, as shown in Table 3. It may be desirable to delay the airborne signal for a predetermined length of time, such as a length of time greater than a maximum length of time for any multiple primary electric bus signals to change from a normal state to a fault state after any of the aeronautical power generation contactor signals change from the engaged state to the disengaged state. A length of time such as approximately five seconds may be sufficient. A time delay circuit 48 may serve this purpose.

TABLE 3

| APES | GOS | AS |
|------|-----|----|
| 0 | 0 | 0 |
| 0 | 1 | 0 |
| 1 | 0 | 1 |
| 1 | 1 | 0 |

The automatic deployment circuit 30 employs a latch signal to indicate the state of the aircraft 6, either grounded or airborne, prior to the occurrence of a fault in the aircraft electric power distribution system 24 such that there is more than a predetermined loss of electric potential in at least one electric power distribution bus 22, wherein a negative state represented by value 0 represents a grounded aircraft state and a positive state represented by value 1 represents an airborne aircraft state. FIG. 2 shows an arrangement of the automatic deployment circuit 30 that changes the latch signal from the negative state to the positive state when the delayed airborne signal changes to the positive state and changes the latch signal from the positive state to the negative state when the ground operations signal changes to the positive state. An RS latch 50 receives the delayed airborne signal on its S input and the ground operations signal on its R input. The Q output of the RS latch 50 serves as the latch signal (LS), and it changes from the negative state to the positive state when the delayed airborne signal changes to the positive state and changes from the positive state to the negative state when the ground operations signal changes to the positive state, as shown in Table 4.

TABLE 4

| S | R | LS |
|---|---|-----|
| 0 | 0 | NC |
| 0 | 1 | 0 |
| 1 | 0 | 1 |
| 1 | 1 | 0 |

To establish whether or not emergency power conditions should trigger the deployment of the ram air turbine, the automatic deployment circuit 30 receives the multiple WOW signals, multiple primary electric bus signals that represent the state of respective primary electric buses 22 from the aircraft electric power distribution system 24, wherein a normal state has a value 0 and a fault state, representing electric potential below a predetermined level, has a value 1, and a ram air turbine generator control unit failsafe signal that represents the state of the emergency power supply system 26, where a safe state has a value 0 and a failure state has a value 1. For instance, if the aircraft has two WOW signals WOW 1 and WOW 2 and two primary electric bus signals AC Bus 1 and AC Bus 2, as well as a ram air turbine generator control unit failsafe signal RAT GCU FS, the automatic deployment circuit 30 will change a ram air turbine enablement signal from a negative state to a positive state when either one of the two WOW signals WOW 1 and WOW 2 is in the air state, represented by value 1, both of the two primary electric bus signals AC Bus 1 and AC Bus 2 are in the fault state, represented by value 1, and the ram air turbine generator control unit failsafe signal RAT GCU FS is in the safe mode, represented by value 0. FIG. 2 shows an arrangement of the automatic deployment circuit 30 to change the ram air turbine engagement signal from a negative state, represented by value 0, to a positive state, represented by value 1, under this circumstance. An OR gate 52 receives the two WOW signals WOW 1 and WOW 2. An AND gate 54 receives the two primary electric bus signals AC Bus 1 and AC Bus 2. An AND gate 56 receives the output of the OR gate 52 and the AND gate 54. An AND gate 58 receives the output of the AND gate 56 and the ram air turbine generator control unit failsafe signal RAT GCU FS by way of an inverted input. The output of the AND gate 58 serves as the ram air turbine enablement signal (RATES), and it changes from the negative state to the positive state when either one of the two WOW signals WOW 1 and WOW 2 is in the air state, represented by value 1, both of the two primary electric bus signals AC Bus 1 and AC Bus 2 are in the fault state, represented by value 1, and the ram air turbine generator control unit failsafe signal RAT GCU FS is in the safe mode, represented by value 0, as shown in Table 5.

TABLE 5

| RAT GTU FS | AC Bus 1 | AC Bus 2 | WOW 1 | WOW 2 | RATES |
|------------|----------|----------|-------|-------|-------|
| 0 | 0 | 0 | 0 | 0 | 0 |
| 0 | 0 | 0 | 0 | 1 | 0 |

TABLE 5-continued

| RAT GTU FS | AC Bus 1 | AC Bus 2 | WOW 1 | WOW 2 | RATES |
|---|---|---|---|---|---|
| 0 | 0 | 0 | 1 | 0 | 0 |
| 0 | 0 | 0 | 1 | 1 | 0 |
| 0 | 0 | 1 | 0 | 0 | 0 |
| 0 | 0 | 1 | 0 | 1 | 0 |
| 0 | 0 | 1 | 1 | 0 | 0 |
| 0 | 0 | 1 | 1 | 1 | 0 |
| 0 | 1 | 0 | 0 | 0 | 0 |
| 0 | 1 | 0 | 0 | 1 | 0 |
| 0 | 1 | 0 | 1 | 0 | 0 |
| 0 | 1 | 0 | 1 | 1 | 0 |
| 0 | 1 | 1 | 0 | 0 | 0 |
| 0 | 1 | 1 | 0 | 1 | 1 |
| 0 | 1 | 1 | 1 | 0 | 1 |
| 0 | 1 | 1 | 1 | 1 | 1 |

In order that the ram air turbine 4 deploys only when the aircraft 6 in which the ram air turbine 4 resides has been airborne or on the ground prior to any serious electrical fault, the automatic deployment circuit 30 changes a ram air turbine deployment signal from a negative state that indicates no deployment, represented by value 0, to a positive state that indicates deployment, represented by value 1, only when both the ram air turbine enablement signal and the latch signal are both in the positive state. FIG. 2 shows an arrangement of the automatic deployment circuit 30 to change the ram air turbine deployment signal from a negative state to a positive state under this circumstance. An AND gate 60 receives the ram air turbine enablement signal and the latch signal. The output of the AND gate 60 serves as the ram air turbine enablement signal (RATDS), and it changes from the negative state, represented by value 0, to the positive state, represented by value 1, when both the ram air turbine engagement signal and the latch signal are both in the positive state, as shown in Table 6.

TABLE 6

| RATES | LS | RATDS |
|---|---|---|
| 0 | 0 | 0 |
| 0 | 1 | 0 |
| 1 | 0 | 0 |
| 1 | 1 | 1 |

It may be desirable to delay the ram air turbine deployment signal for a predetermined length of time and holding it for a predetermined length of time. The time delay may be for a length of time longer than a maximum time for the primary power generation contactor signals to change form the normal state to the fault state, which time may be approximately 200 milliseconds. The holding time may be for a period greater than a length of time needed to engage a ram air turbine solenoid that activates deploys the ram air turbine. To insure deployment, such holding time may be even longer, approximately three times the period needed for the ram air turbine solenoid to activate. A time delay and hold circuit 62 may serve this purpose. The ram air turbine solenoid 28 then engages when the delayed and held ram air turbine deployment signal is in the positive state, represented by value 1.

Although the description of the methodology of the possible embodiment is in the form of digital apparatus, the methodology may also operate in the form of software programmed in a computer, in which case the programmed computer will operate the ram air turbine solenoid 28 in response to the same signals as described in the same manner as for the controller 2. The described embodiment as set forth herein represents only an illustrative implementation of the invention as set forth in the attached claims. Changes and substitutions of various details and arrangement thereof are within the scope of the claimed invention.

The invention claimed is:

1. A method of deploying a ram air turbine only during flight that comprises the steps of:
   changing an aeronautical power engagement signal from a negative state to a positive state when at least a predetermined number of aeronautical power generation contactor signals are in an engaged state;
   changing a ground operations signal from a negative state to a positive state when an external power generation contactor signal is in an engaged state or multiple ones of weight-on-wheel (WOW) signals are in a ground state;
   changing an airborne signal from a negative state to a positive state when the aeronautical power engagement signal is in a positive state and the ground operations signal remains in a negative state;
   delaying the airborne signal for a predetermined length of time;
   changing a latch signal from a negative state to a positive state when the delayed airborne signal changes to the positive state;
   changing the latch signal from the positive state to the negative state when the ground operations signal changes to the positive state;
   changing a ram air turbine enablement signal from a negative state to a positive state when any one of the WOW signals is in an air state, all of multiple primary electric bus signals are in a fault state that represents electric potential below a predetermined level and a ram air turbine generator control unit failsafe signal is in a safe state;
   changing a ram air turbine deployment signal from a negative state to a positive state when the ram air turbine enablement signal and the latch signal are both in the positive state;
   delaying the ram air turbine deployment signal for a predetermined length of time and holding it for a predetermined length of time; and
   engaging a ram air deployment solenoid when the delayed and held ram air turbine deployment signal is in the positive state.

2. The method of claim 1, wherein change of the aeronautical power engagement signal from the negative state to the positive state occurs when at least two of three aeronautical power generation contactor signals are in the engaged state.

3. The method of claim 1, wherein change of the ground operations signal from the negative state to the positive state occurs when the external power generation contactor signal is in the engaged state or both of two WOW signals are in a ground state.

4. The method of claim 1, wherein change of the ram air turbine enablement signal from the negative state to the positive state occurs when either one of two WOW signals in the air state, both of two primary electric bus signals is in the fault state and the ram air turbine generator control unit failsafe signal is in the safe state.

5. The method of claim 1, wherein the predetermined length of time for delay of the airborne signal is longer than a maximum length of time for any of the multiple primary electric bus signals to change from a normal state to the fault state after any of the aeronautical power generation contactor signals change from the engaged state to a disengaged state.

6. The method of claim 1, wherein the predetermined length of time for delay of the ram air turbine deployment signal is longer than a maximum time length of time for the aeronautical power generation contactor signals to change from the normal state to the fault state.

7. The method of claim 1, wherein the predetermined length of time for holding the ram air turbine deployment signal is longer than a maximum length of time needed to engage the ram air deployment solenoid.

8. The method of claim 7, wherein the predetermined length of time for holding the ram air turbine deployment signal is longer than three times the period needed to engage the ram air deployment solenoid.

9. A method of deploying a ram air turbine only during flight that comprises the steps of:
   changing an aeronautical power engagement signal from a negative state to a positive state when at least two of three aeronautical power generation contactor signals are in an engaged state;
   changing a ground operations signal from a negative state to a positive state when an external power generation contactor signal is in an engaged state or both of two weight-on-wheel (WOW) signals are in a ground state;
   changing an airborne signal from a negative state to a positive state when the aeronautical power engagement signal is in the positive state and the ground operations signal is in the negative state;
   delaying the airborne signal for a predetermined length of time;
   changing a latch signal from a negative state to a positive state when the delayed airborne signal changes to the positive state;
   changing the latch signal to the negative state when the ground operations signal changes to the negative state;
   changing a ram air turbine enablement signal from a negative state to a positive state when either one of the two WOW signals is in an air state, both of two primary electric bus signals are in a fault state that represents electric potential below a predetermined level and a ram air turbine generator control unit failsafe signal is in a safe state;
   changing a ram air turbine deployment signal from a negative state to a positive state when the ram air turbine enablement signal and the latch signal are both in the positive state;
   delaying the ram air turbine deployment signal for a predetermined length of time and holding it for a predetermined length of time; and
   engaging a ram air deployment solenoid when the delayed and held ram air turbine deployment signal is in the positive state.

10. The method of claim 9, wherein the predetermined length of time for delay of the airborne signal is longer than a maximum length of time for any of the multiple primary electric bus signals to change from a normal state to the fault state after any of the aeronautical power generation contactor signals change from the engaged state to a disengaged state.

11. The method of claim 9, wherein the predetermined length of time for delay of the ram air turbine deployment signal is longer than a maximum time length of time for the aeronautical power generation contactor signals to change from the normal state to the fault state.

12. The method of claim 9, wherein the predetermined length of time for holding the ram air turbine deployment signal is longer than a maximum length of time needed to engage the ram air deployment solenoid.

13. The method of claim 12, wherein the predetermined length of time for holding the ram air turbine deployment signal is longer than three times the period needed to engage the ram air deployment solenoid.

14. A controller for a ram air turbine that automatically deploys the ram air turbine only during flight comprising:
   digital logic that changes a aeronautical power engagement signal from a negative state to a positive state when at least a predetermined number of aeronautical power generation contactor signals are in an engaged state;
   digital logic that changes a ground operations signal from a negative state to a positive state when an external power generation contactor signal is in an engaged state or multiple ones of weight-on-wheel (WOW) signals are in a ground state;
   digital logic that changes an airborne signal from a negative state to a positive state when the aeronautical power engagement signal is in the positive state and the ground operations signal is in the negative state;
   digital logic that delays the airborne signal for a predetermined length of time;
   digital logic that changes a latch signal from a negative state to a positive state when the delayed airborne signal changes to the positive state;
   digital logic that changes the latch signal to the negative state when the ground operations signal changes to the negative state;
   digital logic that changes a ram air turbine enablement signal from a negative state to a positive state when any one of the WOW signals is in an air state, all of multiple primary electric bus signals are in a fault state that represents electric potential below a predetermined level and a ram air turbine generator control unit failsafe signal is in a safe state;
   digital logic that changes a ram air turbine deployment signal from a negative state to a positive state when the ram air turbine enablement signal and the latch signal are both in the positive state;
   digital logic that delays the ram air turbine deployment signal for a predetermined length of time and holding it for solenoid predetermined length of time; and
   digital logic that engages a ram air deployment solenoid when the delayed and held ram air turbine deployment signal is in the positive state.

15. The controller of claim 14, wherein the digital logic that changes the aeronautical power engagement signal from the negative state to the positive state changes it when at least two of three aeronautical power generation contactor signals are in the engaged state.

16. The controller of claim 14, wherein the digital logic that changes the ground operations signal from the negative state to the positive state changes it when the external power generation contactor signal is in the engaged state or both of two WOW signals are in a ground state.

17. The controller of claim 14, wherein the digital logic that changes the ram air turbine enablement signal from the negative state to the positive state changes it when either one of two WOW signals in the air state, both of two primary electric bus signals is in the fault state and the ram air turbine generator control unit failsafe signal is in the safe state.

18. The controller of claim 14, wherein the digital logic that delays the airborne signal delays it longer than a maximum length of time for any of the multiple primary electric bus signals to change from a normal state to the fault state after any of the aeronautical power generation contactor signals change from the engaged state to a disengaged state.

19. The controller of claim 14, wherein the digital logic that delays the ram air turbine deployment signal delays it longer than a maximum time length of time for the aeronautical power generation contactor signals to change from the normal state to the fault state.

20. The controller of claim 14, wherein the digital logic that holds the ram air turbine deployment signal holds it longer than a maximum length of time needed to engage the ram air deployment solenoid.

21. The controller of claim 20, wherein the digital logic that holds the ram air turbine deployment signal holds it longer than three times the period needed to engage the ram air deployment solenoid.

* * * * *